United States Patent
Cadoux

(10) Patent No.: US 8,446,747 B2
(45) Date of Patent: May 21, 2013

(54) POWER CONVERTER USING NORMALLY ON FIELD EFFECT TRANSISTORS

(75) Inventor: Yvan Cadoux, Saint Aupre (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 330 days.

(21) Appl. No.: 12/889,049

(22) Filed: Sep. 23, 2010

(65) Prior Publication Data

US 2011/0084674 A1    Apr. 14, 2011

(30) Foreign Application Priority Data

Oct. 8, 2009   (FR) ..................................... 09 57015

(51) Int. Cl.
   *H02M 7/5387*   (2007.01)
(52) U.S. Cl.
   USPC .............................. 363/132; 363/363; 363/98
(58) Field of Classification Search
   USPC ................... 363/31, 56.02, 98, 123, 131, 132
   See application file for complete search history.

(56) References Cited

U.S. PATENT DOCUMENTS

| | | | |
|---|---|---|---|
| 6,118,676 A * | 9/2000 | Divan et al. ..................... 363/34 |
| 6,956,751 B2 * | 10/2005 | Youm et al. ..................... 363/37 |
| 7,285,927 B2 * | 10/2007 | Kuramochi et al. .......... 318/139 |
| 8,040,096 B2 * | 10/2011 | Taniguchi ..................... 318/490 |
| 2004/0008530 A1 * | 1/2004 | Kitahata et al. .............. 363/131 |
| 2010/0085787 A1 * | 4/2010 | Kane et al. .................... 363/123 |

FOREIGN PATENT DOCUMENTS

| EP | 1 168 588 A1 | 1/2002 |
| EP | 2 093 871 A1 | 8/2009 |

OTHER PUBLICATIONS

Carsten Rebbereh et al., "First inverter using silicon carbide power switches only", European Conference on Power Electronics, XP008097914, Jan. 1, 2003, 10 pages.

\* cited by examiner

*Primary Examiner* — Jessica Han
(74) *Attorney, Agent, or Firm* — Oblon, Spivak, McClelland, Maier & Neustadt, L.L.P.

(57) ABSTRACT

A power converter includes a bus capacitor connected between a positive line and a negative line of a power supply bus and multiple switching legs connected between the positive line and the negative line of the power supply bus. Each switching leg includes two field-effect type transistors connected in series. The power converter also includes a first switch connected to the positive line of the power supply bus, upstream of the bus capacitor, a second switch connected to the positive line of the power supply bus, downstream of the bus capacitor, and a controller that controls the first switch and the second switch.

12 Claims, 1 Drawing Sheet

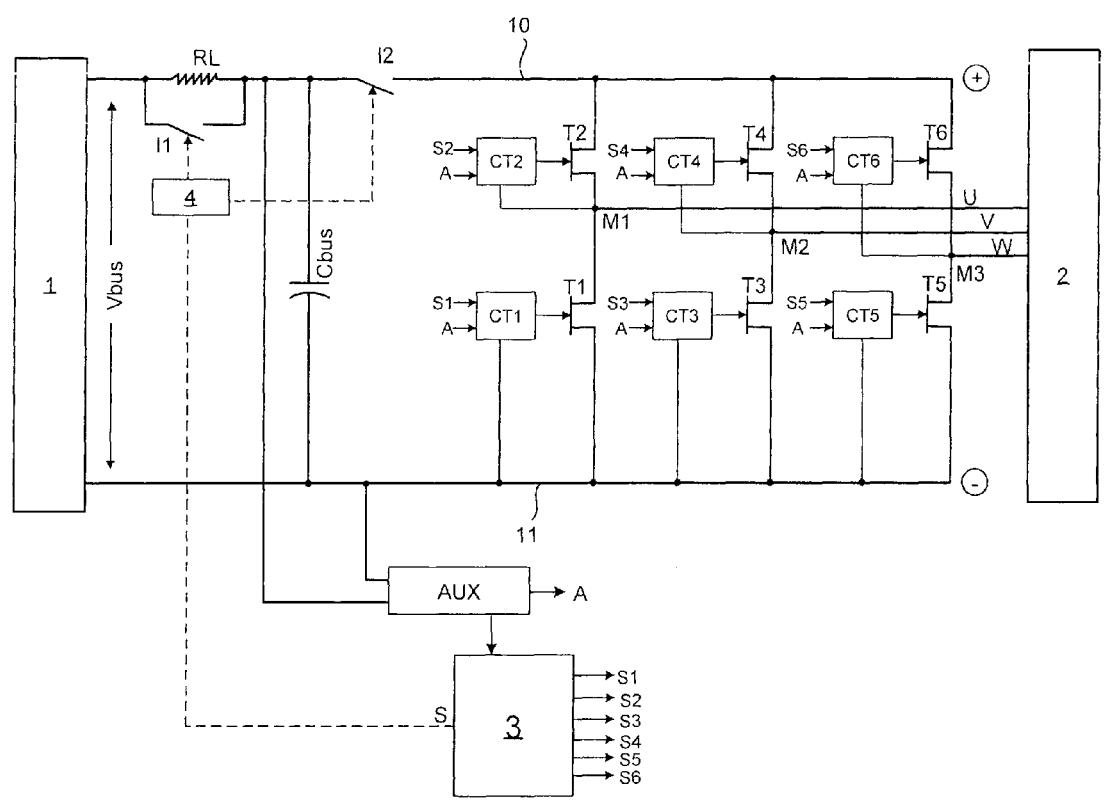

POWER CONVERTER USING NORMALLY ON FIELD EFFECT TRANSISTORS

The present invention relates to a power converter comprising field-effect switching transistors of the normally ON type, said power converter being intended for use, for example, in a variable speed drive, an uninterruptible power supply system or an active filter.

It is known that a power converter comprises a power supply bus provided with a positive line and a negative line, and to which is applied a DC voltage. The power converter also comprises a bus capacitor connected between the positive line and the negative line of the power supply bus and designed to keep the DC voltage constant on the bus. The power converter comprises a number of switching legs, generally three switching legs, connected downstream of the bus capacitor, to the power supply bus. Each switching leg is connected between the positive line and the negative line of the power supply bus and can comprise, for example, two field-effect switching transistors of the normally ON type connected in series on the switching leg. On each leg, a connection mid-point situated between the two transistors is connected to an electrical load. Each transistor is controlled using a control device enabling a control voltage to be applied to it in order to block it. As is known, the transistor control devices are powered by an auxiliary power supply system connected between the positive line and the negative line of the power supply bus.

When the power converter uses field-effect transistors of the normally ON type, it is essential to check on starting that the transistors of the switching legs do not short-circuit the bus capacitor, and thus prevent voltage from being established on the power supply bus and the charging of the auxiliary power supply system. Similarly, when the converter is stopped, it is essential to ensure that the control signals applied to the gates of the transistors do not abruptly short-circuit the bus capacitor before said capacitor is fully discharged.

The aim of the invention is to propose a power converter in which the switching legs or the control signals applied to the gates of the transistors do not short-circuit the bus capacitor respectively when starting up the power converter or when stopping the power converter.

This aim is achieved by a power converter comprising:
- a power supply bus provided with a positive line and a negative line, and to which is applied a DC voltage,
- a bus capacitor connected between the positive line and the negative line of the power supply bus,
- a number of switching legs connected between the positive line and the negative line of the power supply bus, each switching leg comprising two series-connected transistors and a connection mid-point situated between the two transistors and connected to an electrical load,
- the transistors of the switching legs being of the field-effect type and each controlled by a gate control device in order to power the electrical load,
- a first switch connected to the positive line or negative line of the power supply bus, upstream of the bus capacitor,
- a second switch connected in series with the first switch on the positive line or negative line of the power supply bus, downstream of the bus capacitor,
- control means for the first switch and the second switch.

According to a particular feature, the first switch is connected in parallel with a limiting resistor on the positive line or negative line of the power supply bus.

According to another particular feature, the control means for the two switches comprise a double-pole relay, each pole corresponding to one of the two switches.

According to another particular feature, the relay is of the electromechanical contactor type.

According to another particular feature, the gate control devices for the transistors are powered by an auxiliary power supply system connected between the positive line and the negative line of the power supply bus.

According to another particular feature, the field-effect transistors of the switching legs are of the normally ON type or normally OFF type.

According to another particular feature, the transistors of the switching legs are of JFET type.

According to another particular feature, the JFET transistors are fabricated from silicon carbide or gallium nitride.

The invention also relates to a variable speed drive comprising a rectifier module, said variable speed drive also comprising a power converter as defined in one of the preceding claims, connected downstream of said rectifier module.

Other features and advantages will emerge from the following detailed description by referring to an embodiment given by way of example and represented by the appended drawings in which:

FIG. 1 represents the power converter of the invention.

The power converter of the invention as represented in FIG. 1 can be used, for example, in a variable speed drive, an uninterruptible power supply (UPS) system or an active filter. It is designed to receive an input voltage from a source 1 and to apply an output voltage for example to an electrical load 2. In a variable speed drive type application, a rectifier module is used upstream of the converter to rectify the alternating voltage originating from the mains supply.

Referring to FIG. 1, a power converter typically comprises a power supply bus provided with a positive line 10 and a negative line 11 and to which is applied a DC voltage Vbus. The power converter also comprises a bus capacitor Cbus connected between the positive line 10 and the negative line 11 of the power supply bus and designed to keep the DC voltage Vbus of the power supply bus constant. The power converter also comprises, downstream of the bus capacitor Cbus, a switching module with n phases having, on each phase, $2n$ switching transistors. The switching module as represented in FIG. 1 has three phases U, V, W and therefore comprises three switching legs, each connected between the positive line 10 and the negative line 11 of the power supply bus. Each switching leg comprises a top transistor T2, T4, T6 and a bottom transistor T1, T3, T5, separated by a connection mid-point M1, M2, M3 connected to the electrical load 2.

Each transistor T1-T6 of the switching module is of the field-effect transistor (FET) type. A field-effect transistor such as, for example, a JFET or a MOSFET, is a known power electronic switch which comprises a control gate (G), the function of which is to allow or prevent the passage of a current between a Drain (D) and a Source (S). Such a transistor is said to be of the normally ON type if the voltage $V_{GS}$ between the Gate and the Source is close to zero. This means that the Drain-Source path is passing or conducting in the absence of control voltage $V_{GS}$. In the presence of a control voltage $V_{GS}$ between its gate and its source which is negative, the normally ON field-effect transistor is switched OFF. A JFET-type transistor is switched OFF by applying a gate-source voltage $V_{GS}$, for example at least equal to −15 volts, and a MOSFET transistor is switched OFF with a voltage $V_{GS}$ that is, for example, at least equal to −5 volts. Moreover, the transistor is said to be of normally OFF type if, in the absence of a voltage $V_{GS}$ between gate and source, the Drain-Source path is not conducting. It therefore requires a positive gate-source voltage $V_{GS}$ to be switched ON. For a normally OFF JFET-type transistor, this positive voltage is typically between +1 volt and +3 volts.

The field-effect transistors used in the power converter of the invention will, for example, be fabricated from a high-energy band gap material (also called "wide band-gap material") such as, for example, silicon carbide or gallium nitride. As is known, a JFET transistor produced from a high-energy band gap material and of normally ON type offers the advantages of being faster to switch, generating fewer conduction losses in the passing state (low resistance $R_{DSon}$ in the passing state), having a better temperature resistance and being smaller. Hereinafter in the description, and in FIGS. 1 and 2, the transistors T1-T6 used are, for example, of normally ON JFET type. However, it should be understood that the invention can apply to normally OFF type JFET transistors because they have a low control threshold.

Each field-effect transistor T1-T6 of the switching legs is switched OFF by virtue of a specific gate control device CT1-CT6. Each gate control device CT1-CT6 is powered (A) by virtue of an auxiliary power supply system AUX connected between the positive line 10 and the negative line 11 of the power supply bus and is used to apply a gate voltage $V_G$ to the transistor in order to switch the transistor ON or OFF. In addition to the power supply (A), each control device CT1-CT6 receives from a central control system 3, control signals S1 to S6 with pulse width modulation (PWM) that observe a control law executed by the central control system 3. Each control device CT2, CT4, CT6 of the top transistors T2, T4, T6 is connected to the connection mid-point M1, M2, M3 of the switching leg of its transistor, whereas each control device CT1, CT3, CT5 of the bottom transistors T1, T3, T5 is connected to the negative line 11 of the power supply bus. Since the control devices CT1-CT6 are already known, they are not detailed in the present application.

Moreover, the converter of the invention comprises, on the positive line 10 of the power supply bus, upstream of the bus capacitor Cbus, a limiting resistor RL also called precharging resistor in parallel with which is connected a first switch I1. This limiting resistor is active on starting during the power supply bus charging phase. In a variable speed drive, it can be used to limit the input current through the rectifier module. Once the bus capacitor Cbus is charged, the limiting resistor RL is short-circuited by the first switch I1 connected in parallel.

The power converter also comprises, on the positive line 10 of the power supply bus, downstream of the bus capacitor Cbus, a second switch I2. The two switches I1, I2 are therefore connected in series on the positive line 10 of the power supply bus and positioned either side of the point of connection of the bus capacitor Cbus to the positive line 10 of the power supply bus. This second switch I2 is used to isolate the switching legs from the power supply bus when the bus capacitor Cbus is being charged.

According to the invention, the two switches I1, I2 are, for example, mutually-synchronized relays controlled by the control means 3 described hereinabove. The relays are, for example, of electromechanical type. In a variant embodiment, the two relays are replaced by a single mechanical relay, for example of the bipolar contactor type 4. According to the invention, it is in fact possible to re-use the contactor 4 already employed to control the first switch I1 and to add to it a second pole to control the second switch I2. Each pole of the contactor then represents a switch I1, I2 to be controlled. By sending a single control signal S to the contactor 4, the two switches I1, I2 are then simultaneously controlled.

The power converter of the invention operates as follows:

Before power-up, the bus capacitor Cbus is discharged and the transistors T1-T6 which are normally OFF are ON because no control voltage is applied to their respective gates. The two switches I1 and I2 are OFF and the voltage of the auxiliary power supply system AUX is zero.

When the converter is started up, the source 1 applies a DC voltage to the power supply bus causing the bus capacitor Cbus to be charged. The bus voltage Vbus increases. The bus capacitor Cbus is charged via the limiting resistor RL. The two switches I1 and I2 remain OFF. Since the second switch I2 is in the OFF state, the three switching legs are decoupled from the bus capacitor Cbus. This therefore allows the voltage at the terminals of the bus capacitor Cbus and the voltage of the auxiliary power supply system AUX to rise.

Once the bus capacitor Cbus is charged, the auxiliary power supply system AUX has finished starting up and is therefore charged. The auxiliary power supply system AUX is then used to power the control devices CT1-CT6 of the transistors T1-T6 of the switching module. The transistors T1-T6 can therefore be directly switched OFF by their control device CT1-CT6 by applying a control voltage to their respective gates. Once all the transistors T1-T6 are OFF, the two switches I1 and I2 are simultaneously switched ON. For this, the control means 3 send the control signal S to the contactor 4, giving it the command to switch ON the two switches I1, I2. The limiting resistor RL is then short-circuited via the first switch I1 and the power supply bus is now connected to the switching legs via the second switch I2. The converter can then operate normally.

When the converter is switched OFF, the control means 3 stop the contactor 4 which causes the two switches I1 and I2 to be simultaneously switched OFF. The switching legs are then once again electrically isolated from the power supply bus. Before the two switches I1, I2 are fully OFF, the auxiliary power supply system AUX mist guarantee a voltage level that is sufficient to keep the transistors T1-T6 in the OFF state.

According to the invention, the two switches I1 and I2 can also be positioned in series on the negative line 11 of the power supply bus, either side of the point of connection of the bus capacitor Cbus to this line.

Obviously, it is possible, without departing from the framework of the invention, to consider other variants and refinements of detail and even to consider the use of equivalent means.

The invention claimed is:

1. A power converter, comprising:
a power supply bus provided with a positive line and a negative line, and to which is applied a DC voltage;
a bus capacitor connected between the positive line and the negative line of the power supply bus;
a plurality of switching legs connected between the positive line and the negative line of the power supply bus, each switching leg comprising two series-connected transistors and a connection mid-point situated between the two transistors to which an electrical load is connected, each of the transistors of the switching legs being of a field-effect type, and each of the transistors of the plurality of switching legs being controlled by a distinct gate control device in order to power the electrical load, each distinct gate control device being powered by an auxiliary power supply;
a first switch connected to the positive line or negative line of the power supply bus, upstream of the bus capacitor;
a second switch connected in series with the first switch on the positive line or negative line of the power supply bus, downstream of the bus capacitor; and control means for controlling the first switch and the second switch.

2. The power converter according to one of claim 1, wherein the gate control devices for the plurality of transistors are powered by an auxiliary power supply system connected between the positive line and the negative line of the power supply bus.

3. The power converter according to one of claim 1 or 2, wherein the plurality of transistors, which are of the field-effect type, are of a normally ON type.

4. The power converter according to one of claim 1 or 2, wherein the plurality of transistors, which are of the field-effect type, are of a normally OFF type.

5. The power converter according to claim 1, wherein the plurality of transistors are of a JFET type.

6. The power converter according to claim 5, wherein the JFET transistors are fabricated from silicon carbide or gallium nitride.

7. A variable speed drive comprising a rectifier module and the power converter as defined in claim 1, connected downstream of said rectifier module.

8. The power converter according to claim 1, wherein the first switch is connected in parallel with a limiting resistor on one of the positive line and the negative line of the power supply bus.

9. The power converter according to claim 1 or 8, wherein the control means for the two switches includes a double-pole relay, each pole corresponding to one of the two switches.

10. The power converter according to claim 9, wherein the double-pole relay is of an electromechanical contactor type.

11. The power converter according to claim 10, wherein the gate control devices for the plurality of transistors are powered by an auxiliary power supply system connected between the positive line and the negative line of the power supply bus.

12. The power converter according to claim 10, wherein the plurality of transistors, which are of the field-effect type, are of a normally ON type.

* * * * *